(No Model.)
W. H. FAIRLESS.
LATHE CENTER.
No. 333,619. Patented Jan. 5, 1886.
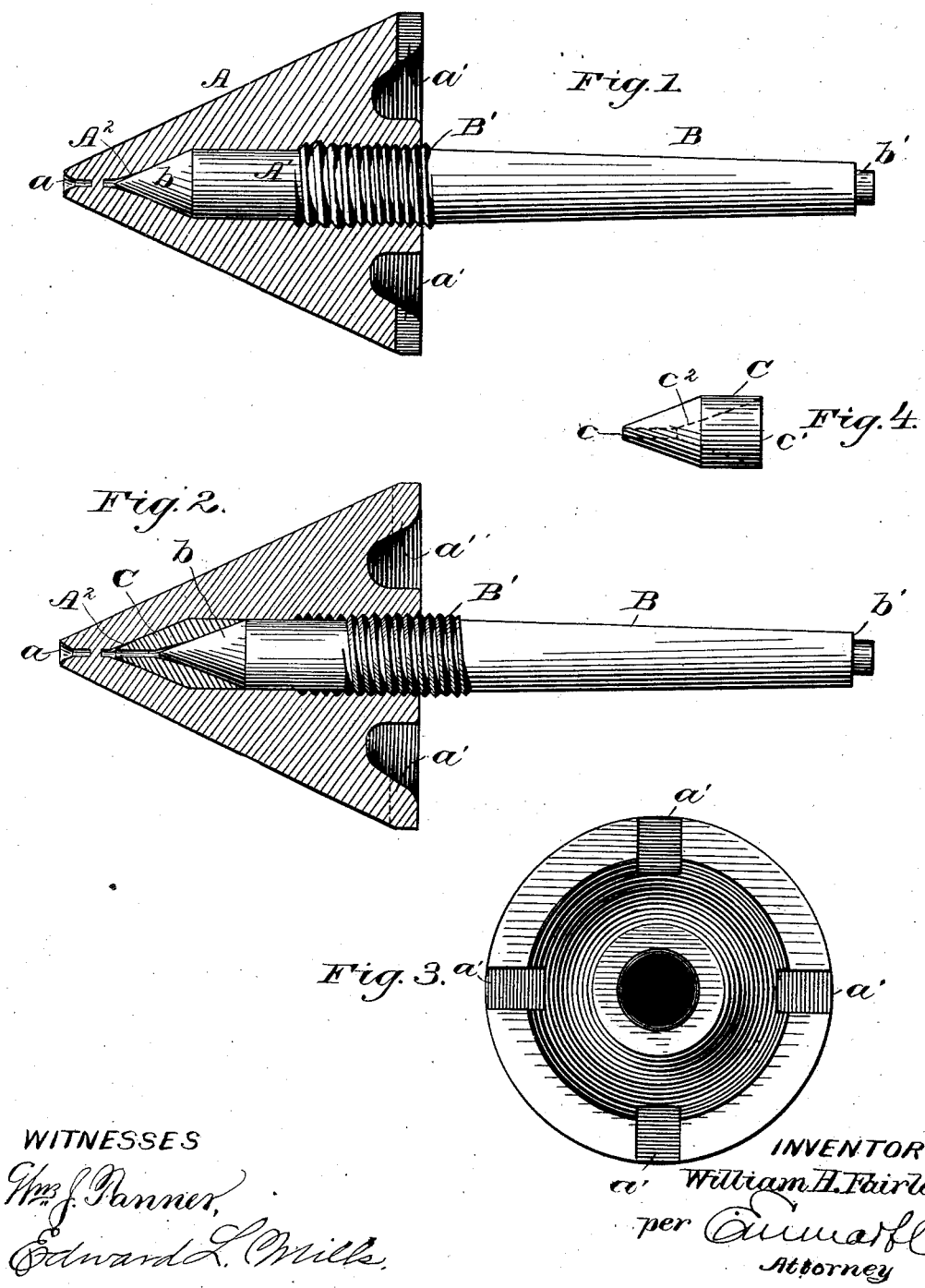
WITNESSES
INVENTOR
William H. Fairless
per Emma fle
Attorney

UNITED STATES PATENT OFFICE.

WILLIAM H. FAIRLESS, OF PORTSMOUTH, VIRGINIA.

LATHE-CENTER.

SPECIFICATION forming part of Letters Patent No. 333,619, dated January 5, 1886.

Application filed October 2, 1885. Serial No. 178,842. (No model.)

*To all whom it may concern:*

Be it known that I, WILLIAM H. FAIRLESS, a citizen of the United States, residing at Portsmouth, in the county of Norfolk and State of Virginia, have invented certain new and useful Improvements in Lathe-Centers, of which the following is a specification, reference being had therein to the accompanying drawings.

My invention relates to lathe-centers; and it consists in the construction and arrangement of the parts, which will be more fully hereinafter described, and pointed out in the claims.

The object of my invention is to provide a lathe-center easy of adjustment to lathes of different sizes, simple in construction, cheaply manufactured, readily understood and operated, and economical in use.

Heretofore lathe-centers have been made in one piece; or, if in more than one piece, the parts have been secured together by bolts and other devices, requiring time and skill to adjust them. They have also been constructed without any means of adjustment within themselves, so that when worn to any appreciable extent new ones must be substituted in order to secure the necessary adjustment of the lathe to the work being operated upon. These difficulties, inconveniences, and changes, causing delay and loss of time, and subjecting the owner to no inconsiderable expense, I overcome by my invention, illustrated in the accompanying drawings, forming a part of this application, in which like letters refer to similar parts, and in which—

Figure 1 is a longitudinal sectional view of my improved lathe-center, showing the manner of securing the central pin to the cone. Fig. 2 is a sectional view showing the manner of adjusting the cone longitudinally on the pin by means of a washer. Fig. 3 is a view of the back part of the cone, showing the slots by which the same is held from turning by a suitable dog, and Fig. 4 represents a washer to be used on the center pin within the cone for adjusting the cone.

A represents the cone with a hole or bore, A', partly screw-threaded, and having funnel-shaped end $A^2$. $a$ is the center gage for lining up the lathe to a true center, and $a'$ $a'$ are the slots in the back part of the cone, by which it may be secured from turning by a suitable dog.

B represents the center pin, having an enlarged portion or band, B', which is screw-threaded to fit into the screw-threaded part of the cone A, and also a cone-shaped point, $b$, and jointed or socketed end $b'$.

C represents a washer having a cone-shaped point, $c$, an open end, $c'$, and an inner funnel-shaped end, $c^2$. This washer may be of any desired length to provide for the proper adjustment of the cone, as hereinafter explained. This washer is formed so as to fit tightly into the funnel-shaped end $A^2$ of the bore A' in the cone A and over the point $b$ of the center pin, B, as shown in Fig. 2.

In constructing my lathe-center, I cut the slots $a'$ $a'$ in the periphery of the cone A, as shown in Fig. 3, and then bore the hole A' to the required depth, carefully routing out the funnel-shaped end $A^2$. I then cut the thread in the outer end of the hole A' about one inch in length. The pin B is made of any desired length, with its point $b$ cone-shaped to fit the end of the hole A' in cone A. A short distance back from said point the pin is enlarged, so as to form the band B' of such thickness as to be screw-threaded, as shown in Figs. 1 and 2. Back from the enlarged part it is reduced in diameter and provided with the jointed end or socket $b'$.

To form the lathe-center, the pin B is inserted into the hole A' of the cone A and screwed down until the point $b$ fits tightly in the end $A^2$.

In adjusting the lathe-center to lathes of different sizes, a washer, C, as shown in Fig. 4, of the required length, is snugly fitted into the end $A^2$ and the pin B screwed down until its point $b$ fits closely into the end $c''$. If the point $b$ of pin B becomes worn, a new socket may be formed on it and the pin turned back the necessary distance, a washer being placed over the point $b$, as just described.

In the ways just described the center may be adjusted to lathes of different sizes, or the pin B repaired, as may be necessary.

In fitting the center to lathes, a short space— say one-half inch, or thereabout—should be left between the hub of the cone and the spindle inclosing the center pin, to provide for the necessary adjustment of the center or repair of the pin B.

I do not limit myself to the particular construction of lathe-center herein shown, as it is obvious that changes can be made therein without departing from the principle or nature of my invention.

Having thus described my invention, what I claim, and desire to secure by Letters Patent, is—

1. In a lathe-center, the combination of a cone, a center pin, and means, substantially as described, for adjusting the cone longitudinally on the pin, as set forth.

2. In a lathe-center, the combination of a cone having a central bore funnel-shaped at one end and recessed at the other, as at *a*, and in part screw-threaded, and a central pin having an enlarged screw-threaded part and a cone-shaped point adapted to fit the bore in the cone, substantially as described.

3. In a lathe-center, the combination of a cone having a central bore, a pin adapted to fit said bore, and a washer adapted to fit in the funnel-shaped end of the bore in the cone and over the end of the pin, whereby the cone may be longitudinally adjusted on the pin and still preserve its true central line, substantially as described, for the purposes set forth.

4. An adjustable lathe-center consisting of a cone having a central bore funnel-shaped at one end and in part screw-threaded, a central pin having an enlarged screw-threaded part and a cone-shaped point adapted to fit the bore in the funnel-shaped end, and a socket end, substantially as described.

In testimony whereof I affix my signature in presence of two witnesses.

WILLIAM H. FAIRLESS.

Witnesses:
C. S. SHERWOOD,
A. W. HANEY.